Oct. 24, 1961 L. MEYDING ET AL 3,005,361

SPINDLE-ADJUSTING MECHANISM FOR AN OPTICAL DIVIDING HEAD

Filed Nov. 24, 1958 3 Sheets-Sheet 1

INVENTORS
LOTHAR MEYDING
FRIEDRICH BENDER
BY Toulmin & Toulmin
ATTORNEYS

SPINDLE-ADJUSTING MECHANISM FOR AN OPTICAL DIVIDING HEAD
Filed Nov. 24, 1958 3 Sheets-Sheet 2
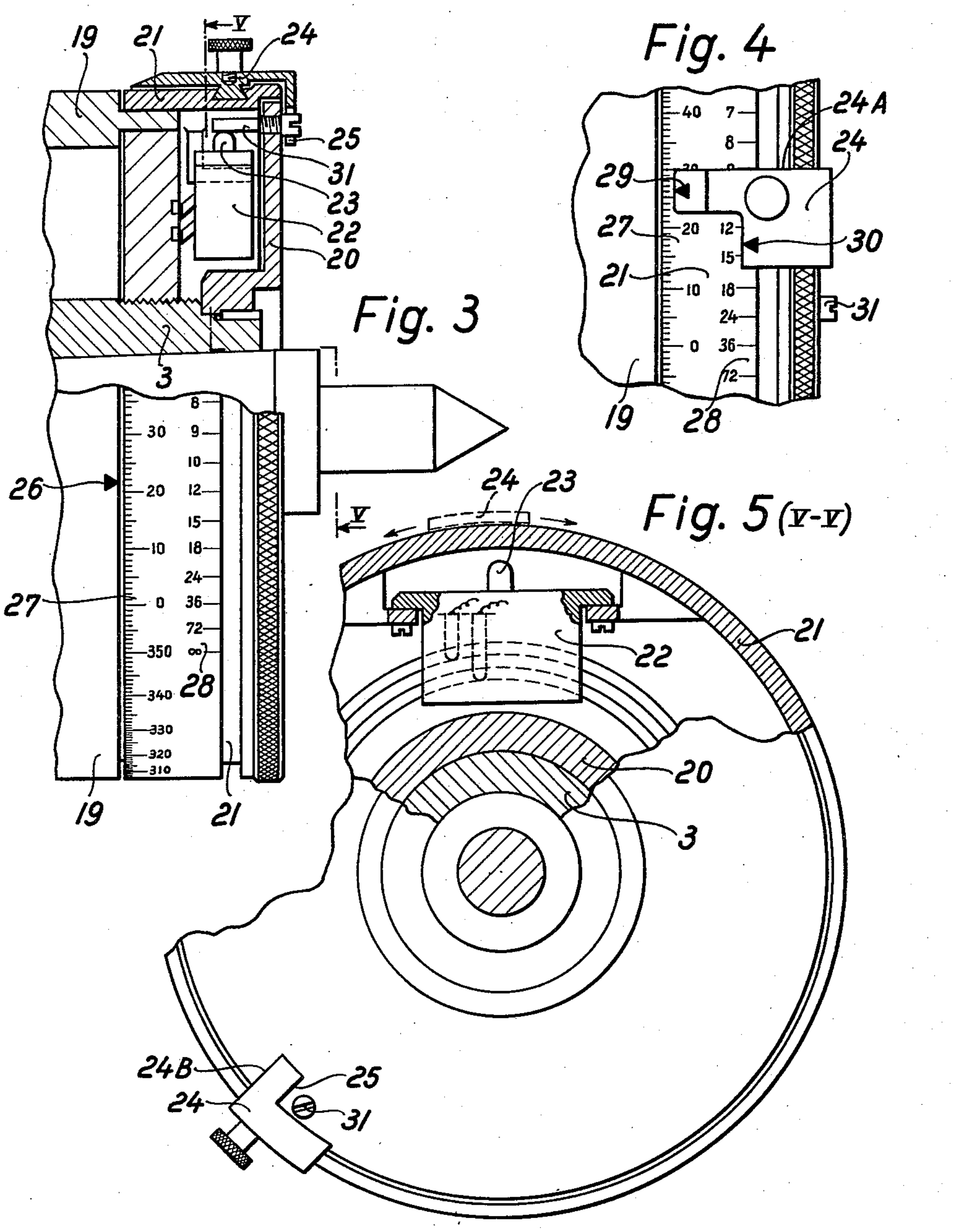
Fig. 3, Fig. 4, Fig. 5 (V-V)
INVENTORS
LOTHAR MEYDING
FRIEDRICH BENDER
BY Toulmin & Toulmin
ATTORNEYS INVENTORS
LOTHAR MEYDING
FRIEDRICH BENDER
BY Toulmin & Toulmin
ATTORNEYS United States Patent Office 3,005,361

Patented Oct. 24, 1961

3,005,361

SPINDLE-ADJUSTING MECHANISM FOR AN OPTICAL DIVIDING HEAD

Lothar Meyding, Wetzlar (Lahn), and Friedrich Bender, Lohnberg (Lahn), Germany, assignors to Ernst Leitz G.m.b.H., Wetzlar, Germany Filed Nov. 24, 1958, Ser. No. 775,987
Claims priority, application Germany Nov. 28, 1957
10 Claims. (Cl. 74—825)

The present invention relates to an optical dividing head wherein the spindle can be rapidly adjusted, more particularly to an optical dividing head having a manually operable coarse adjustment and a motor-driven fine adjustment with the motor being controlled by an adjusting mechanism mounted on the spindle.

In machine shop work, when regularly occurring machine operations are being carried out, such as, for example, when milling a hexagon, the spindle carrying the work must be rotated until the work piece is properly positioned for successive machine operations. Generally, a hand-operated optical dividing head is used wherein rotary motion of a hand crank is transmitted by a worm gear arrangement to the spindle. The coarse adjustment of the spindle must be carried out rather slowly because, if the spindle is moved too rapidly, the division or index numbers will no longer be discernible to the operator. These numbers are generally viewed through a magnification system so that rapid movement of the numbers will prevent reading of the same by the operator. Since the operator must carefully follow the index numbers in order to determine the proper positioning of the spindle, the coarse adjustment of the spindle will take a relatively long time.

Optical dividing heads have been provided wherein the spindle can be coarse-adjusted by hand and subsequently turned independently or coupled with a fine adjustment for ultimate positioning of the index numbers. Such an arrangement will reduce the time of adjusting the spindle, but the procedure is still relatively slow.

The present invention overcomes the disadvantages of known optical dividing heads by decreasing the time employed in adjusting the spindle for successive machining operations. This invention essentially comprises an attachment which is fitted on the optical dividing head so as to permit rapid adjustment of the spindle.

The optical dividing head of this invention is provided with a gear system operated by a manual crank for coarse adjustment of the spindle, with a second gear system for fine adjustment connected to the first gear system and actuated by an electric motor. The electric motor is controlled by an adjusting disk fixed upon the spindle and an adjusting ring carrying an electric switch and rotatable with respect to the spindle. The electric switch controls the electric motor and is actuated by structure carried by the adjusting disk.

Two scales are provided on the adjusting ring for rough adjustment of the spindle. One scale is a 360° scale for indicating angles, and the other scale is a $360°/n$ scale, $n$ being an integer for indicating divisions of a revolution. The sliding indicator is mounted on the adjusting scale and has two marks thereon for cooperation with both of said scales. The sliding indicator may be clamped in position on the adjusting ring so as to accurately indicate the positioning of the spindle for successive machining operations.

The electric control circuit for the electric motor comprises contacts which are actuated by the switch on the adjusting disk to start and stop the electric motor. A magnetic brake is also provided which is energized upon opening of the motor switch so that the electric motor will immediately come to a standstill to stop the spindle close to the desired position. Means are then provided for manual manipulation of the fine adjustment to ultimately position the spindle. This fine adjustment will only take a few seconds of time, since the major movement of the spindle to its new position has been accomplished by the electric motor, which of course will rotate the spindle at a high speed due to the gear transmission ratio.

This invention can also be used for feed movement of the spindle during machining operation. The stop for limiting the movement of the spindle is determined by the position of the slide indicator on the adjusting ring.

It is therefore the principal object of this invention to provide a novel and improved optical dividing head for a spindle which can be rapidly adjusted to a desired position.

Further objects and advantages of this invention will be readily apparent upon reference to the accompanying description and to the following drawings, wherein:

FIGURE 3 is a side elevational view of the end of the spindle housing with a portion thereof shown in section to illustrate the attachment for controlling the motor;

FIGURE 4 is a side elevational view of a portion of the spindle housing as shown in FIGURE 1, in enlarged scale in order to illustrate the indicating scales on the adjusting ring and the slide indicator;

FIGURE 5 is a sectional view taken along the line 5—5 of FIGURE 3 and also showing the mounting of the switch for controlling the electric motor;

Figure 1:
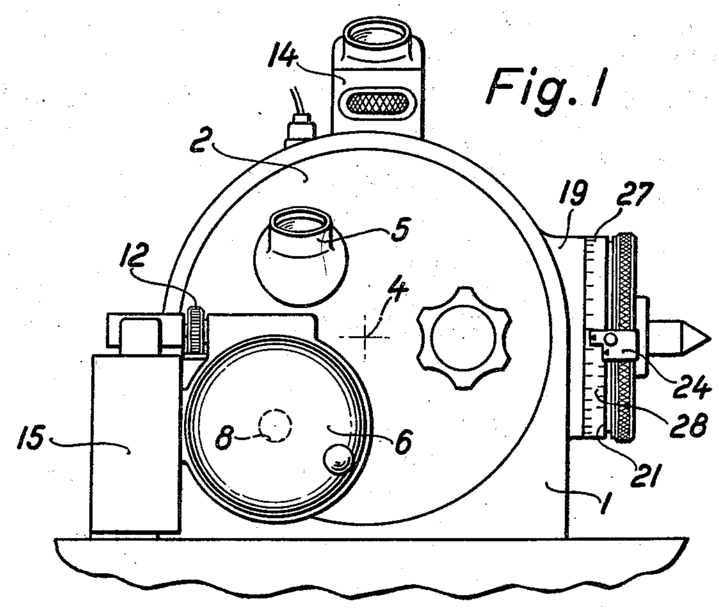
FIGURE 1 is a side elevational view of the optical head of this invention.

Proceeding now to the drawings, wherein like reference symbols indicate the same parts throughout the various views, reference to FIGURE 1 illustrates the housing 1 of the optical dividing head which carries the dividing head body 2. A spindle 3 extends throughout the optical dividing head and is rotatable about the axis 4 within the housing 1. The position at any time of the spindle 3 is indicated through an optical pick-up having an eye-piece 5.

Figure 2:
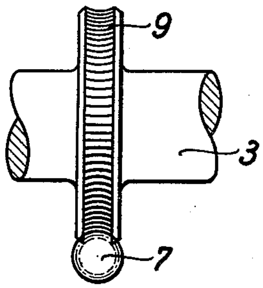
FIGURE 2 shows the worm gear arrangement for rotating the spindle by means of the manual crank.
Figure 6:
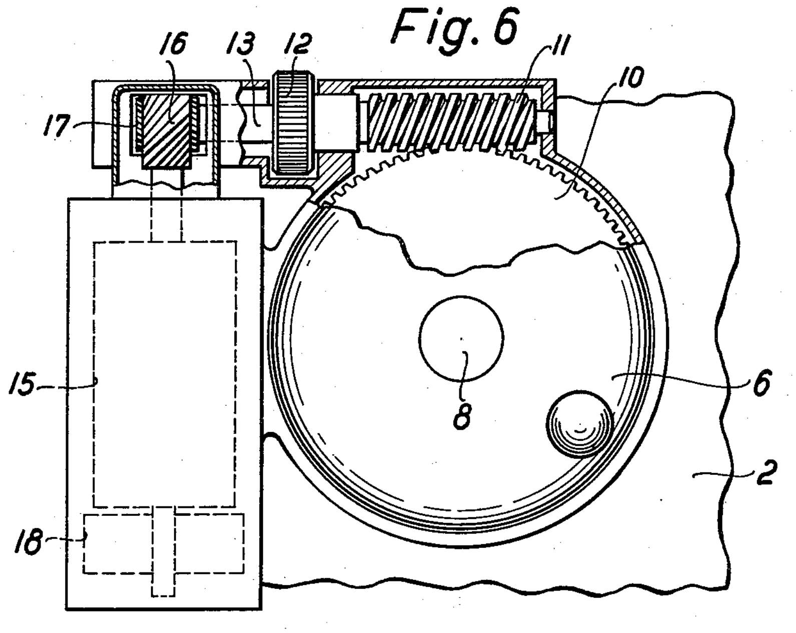
FIGURE 6 is a side elevational view of a portion of the optical dividing head shown in FIGURE 1 with portions thereof removed to show the gear arrangement for driving the spindle both from the motor and from the manual crank.
Figure 7:
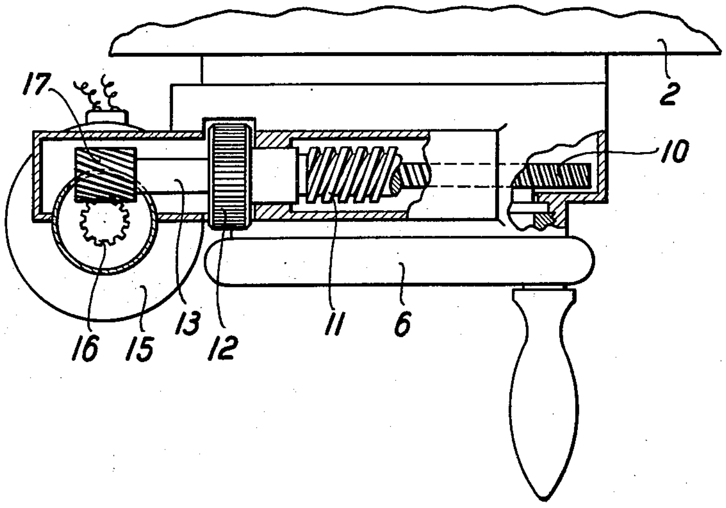
FIGURE 7 is a top plan view of the gear arrangements illustrated in FIGURE 6.

A manually operated crankwheel 6 and a worm 7 are mounted upon a rotatable shaft 8. The worm 7 meshes with a wormwheel 9 which is mounted on the spindle 3, as can be seen in FIGURE 2. The shaft 8 also has mounted thereon a wormwheel 10 which meshes with a worm 11 which, together with an adjusting wheel 12 having a knurled surface, is mounted upon a shaft 13. The angles to which the elements 6 through 13 can be adjusted are indicated in an optical pick-up having an eye-piece 14 located on the top surface of the dividing head housing 1.

An electric motor 15 is drivingly connected to the shaft 13 by a worm 16 and a wormwheel 17. A brake magnet mechanism 18 is mounted upon the motor shaft to bring the electric motor to a standstill as soon as possible after the motor has been deenergized.

The mechanism for controlling the electric motor and the brake magnet is mounted upon the spindle housing 19 which encloses the spindle 3. This mechanism comprises an adjusting disk 20 which is keyed to the spindle 3 so as to be fixed thereon, and an adjusting ring 21 which is rotatably mounted on the end of the spindle housing 19 and projects over the adjusting disk 20 as may be seen in FIGURE 3. There is also a switch 22 which is actuated by a plunger 23, which switch is normally closed and is opened when the plunger is depressed. A slide indicator 24 is mounted on the adjusting ring 21 and can be clamped in position thereon. The slide indicator comprises an axial portion 24A and a transverse portion 24B. The transverse portion has a notch 25 thereon which forms an abutment edge or a stop.

There is a fixed mark 26 mounted on the spindle housing for indicating the rotation of the adjusting ring 21. The adjusting ring 21 carries a scale 27 which is a 360° scale for indicating angles and a scale 28 which is a 360°/*n* scale, *n* being an integer for indicating portions of a revolution of the spindle. Both of the scales 27 and 28 are used for the coarse adjustment of the spindle 3. The slide indicator which is slidable on the adjusting ring 21 has a mark 29 for registration with the scale 27 and a mark 30 for registration with the scale 28. A stop bolt 31 is fixed on the adjusting disk 20 and extends beyond both sides of the disk. The inner end of the stop bolt actuates the plunger 23, and the outer end is engageable with the abutment edge 25 of the slide indicator 24.

Figure 8:
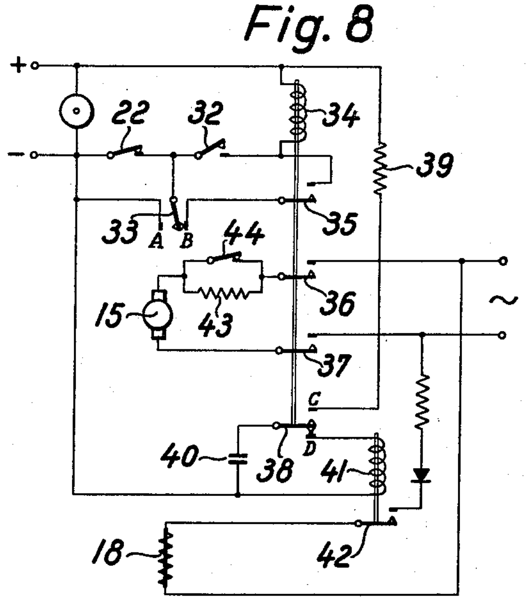
FIGURE 8 is a schematic diagram showing the electrical control circuit for this optical dividing head.

The electrical control circuit for controlling the electric motor and the magnetic brake comprises two sources of electric power, with one source energizing the motor and magnetic brake and the other energizing the various control relays. The control circuit further comprises the switch 22 previously described and a starting switch 32 which is in series with the switch 22. There is a double-pole single-throw switch 33 which has two contacts A and B across the switches 22 and 32, with the switch blade being connected between the switches 22 and 32. There is a relay 34 connected across the relay power source for controlling switches 35, 36, 37 and 38, which are shown in FIGURE 8 in the position when the relay is deenergized. The switch 35 is in series with the contacts 33A and B. The switches 36 and 37 are in the motor power circuit. The switch 38 is also a double-pole single-throw blade switch having contacts C and D. There is a charging resistance 39 connected to one side of the control power source and to the contact 38C. A condenser 40 is in series with the blade of the switch 38 and the other side of the control power source. A relay 41 which is shown in FIGURE 8 in its normal deenergized position is connected across the condenser 40 to the contact 38D. A switch 42 is located in a magnetic braking circuit for energizing the magnetic brake. A resistance 43 is connected with the motor 15. There is a circuit connnected to the motor 15 and across the resistance 43 and having a switch 44 which is normally closed as shown in FIGURE 8. The switch 44 can be selectively opened by the optical dividing head operator to short out the resistance 43 and to increase the speed of the motor.

With the above structure in mind, the adjusting of the spindle will next be described. The components of the electrical control circuit are all in the position as indicated in FIGURE 8. If it is desired to rapidly rotate the spindle 3 through a portion of a revolution, such as, for example, one-eighth, the mark 30 on the slide indicator 24 is positioned in registration with the index line "8" on the index scale 28. The indicator slide 24 is clamped on the adjusting ring 21, and the ring and the clamp are rotated in a counterclockwise direction as viewed in FIGURE 5, until the abutment edge 25 of the indicator slide contacts the stop bolt 31. Since the stop bolt is not engaged with the switch plunger 23, the switch 22 is closed.

In order to rotate the spindle, the starting switch 32 is depressed to energize the relay 34 through the switches 22 and 32. Energization of the relay 34 will close the switches 35, 36 and 37 and will move the switch blade 38 into engagement with the contact C. Closing of the switch 35 will establish a holding circuit through the relay 34 so as to maintain the relay 34 energized after the starting switch 32 is released to its open position.

Closing of the switches 36 and 37 will connect the motor 15 across the source of alternating current to start the motor. Further, the condenser 40 is charged through its connection with the resistance 39 through the electrical connection 38C formed by movement of the switch blade 38 into its upper position.

The motor 15 will rotate the spindle and the adjusting disk 20 which is keyed thereto, until the inner portion of the stop bolt 31 engages the plunger 23 to depress the plunger and open the switch 22. Upon opening of the switch 22, the relay 34 will be deenergized and the switches 35, 36 and 37 will be opened, and the blade of the switch 38 will engage the contact 38D. This will cause the condenser 40 to be discharged through the relay 41 to energize the relay 41 for a period of time sufficient to close the switch 42. This will connect the magnetic brake 18 across a source of electric power to energize the magnetic brake and to rapidly brake the electric motor to a standstill. The knurled hand wheel 12 is then carefully rotated by hand to precisely adjust the position of the spindle to the desired angle.

The spindle 3 can be rapidly adjusted to a predetermined angle by indicating this angle on the scale 27 of the mark 29 on the indicator slide 24. The spindle and the adjusting ring 21 will then be rotated by the motor until this angle is reached, at which time the switch 22 will be opened to stop the motor.

The electric motor 15 can be used merely to drive the spindle 3. In this procedure the switch 33 is moved to engage the switch blade with the contact A. This will eliminate the holding circuit formed by the switch 35 around the relay 34. Thus, closing of the starting switch 32 will energize the relay 34 and will cause the motor to run as long as the switch 32 is closed. When the end of the driving of the spindle is reached, the starting switch 32 is released and the motor will stop rotation of the spindle 3. It is pointed out that when used as herein described, the motor will continue to operate even when the switch 32 is open.

In the event the motor 15 is used as a feed motor during a machining operation, the adjusting ring 23 can function as a limit stop as described above for the feeding movement of the spindle 3.

If it is desired to operate the motor 15 at a reduced rate of speed, the switch 44 is open and the resistance 23 will be connected into circuit with the motor.

Thus it can be seen that the present invention provides an optical dividing head wherein an electric motor is used to rotate the spindle to its desired position, with the precise position of the spindle being achieved by manual manipulation of a fine adjustment. The use of the control mechanism as described herein provides an accurate and precise control over the electric motor for rotating the spindle into various positions. Further, the motor control mechanism is extremely simple in construction and in operation, and does not require undue maintenance for accurate operation.

It will be understood that this invention is susceptible to modification in order to adapt it to different usages and conditions, and, accordingly, it is desired to comprehend such modifications within this invention as may fall within the scope of the appended claims.

What is claimed is:

1. In an optical dividing head, a rotatable spindle, first gear means operatively connected to said spindle for coarse adjustment thereof, a manually operable crank operatively connected to said first gear means for operating said first gear means, second gear means drivingly coupled to said first gear means, an adjusting wheel operatively connected to said second gear means for operating said second gear means for fine adjustment of said spindle through said first gear means, and an electric motor drivingly connected to said second gear means to adjust said spindle through said first gear means.

2. In an optical dividing head a rotatable spindle, first gear means operatively connected to said spindle for coarse adjustment thereof, a manually operable crank operatively connected to said first gear means for operating said first gear means, second gear means drivingly coupled to said first gear means, an adjusting wheel operatively connected to said second gear means for operating said second gear means for fine adjustment of said spindle through said first gear means, a disk fixed to said spindle for rotation therewith, an adjusting ring rotatably mounted on said spindle, and an electric motor drivingly connected to said second gear means to adjust said spindle through said first gear means, there being an electric switch on said adjustable ring for energizing said electric motor.

3. In an optical dividing head a rotatable spindle, first gear means operatively connected to said spindle for coarse adjustment thereof, a manually operable crank operatively connected to said first gear means for operating said first gear means, second gear means drivingly coupled to said first gear means, an adjusting wheel operatively connected to said second gear means for operating said second gear means for fine adjustment of said spindle through said first gear means, a disk fixed to said spindle for rotation therewith, an adjusting ring rotatably mounted on said spindle, there being on said adjusting ring a 360° scale for indicating angles and a 360°/$n$ scale where $n$ is an integer for indicating fractions of a revolution, and an electric motor drivingly connected to said second gear means to adjust said spindle through said first gear means, there being an electric switch on said adjustable ring for energizing said electric motor.

4. In an optical dividing head a rotatable spindle, first gear means operatively connected to said spindle for coarse adjustment thereof, a manually operable crank operatively connected to said first gear means for operating said first gear means, second gear means drivingly coupled to said first gear means, an adjusting wheel operatively connected to said second gear means for operating said second gear means for fine adjustment of said spindle through said first gear means, a disk fixed to said spindle for rotation therewith, an adjusting ring rotatably mounted on said spindle, there being on said adjusting ring a 360° scale for indicating angles and a 360°/$n$ scale where $n$ is an integer for indicating fractions of a revolution, an indicator clamp slidably mounted on said adjusting ring for cooperation with said 360° and 360°/$n$ scales and having an abutment edge thereon, and an electric motor drivingly connected to said second gear means to adjust said spindle through said first gear means, there being an electric switch on said adjustable ring for energizing said electric motor.

5. In an optical dividing head a rotatable spindle, first gear means operatively connected to said spindle for coarse adjustment thereof, a manually operable crank operatively connected to said first gear means for operating said first gear means, second gear means drivingly coupled to said first gear means, an adjusting wheel operatively connected to said second gear means for operating said second gear means for fine adjustment of said spindle through said first gear means, a disk fixed to said spindle for rotation therewith, a stop bolt mounted on said disk, an adjusting ring rotatably mounted on said spindle, there being on said adjusting ring a 360° scale for indicating angles and a 360°/$n$ scale where $n$ is an integer for indicating fractions of a revolution, an indicator clamp slidably mounted on said adjusting ring for cooperation with said 360° and 360°/$n$ scales and having an abutment edge thereon, and an electric motor drivingly connected to said second gear means to adjust said spindle through said first gear means, there being an electric switch on said adjustable ring for energizing said electric motor, said electric switch being engageable with said stop bolt for actuation thereby.

6. In an optical dividing head a rotatable spindle, first gear means operatively connected to said spindle for coarse adjustment thereof, a manually operable crank operatively connected to said first gear means for operating said first gear means, second gear means drivingly coupled to said first gear means, an adjusting wheel operatively connected to said second gear means for operating said second gear means for fine adjustment of said spindle through said first gear means, a disk fixed to said spindle for rotation therewith, a stop bolt mounted on said disk, an adjusting ring rotatably mounted on said spindle, an electric motor drivingly connected to said second gear means, there being an electric switch on said adjustable ring for energizing said electric motor, and an electrical circuit for controlling said electric motor and including a starting switch, a relay, and electrical contacts actuated by said disk electric switch so that closing of said starting switch will close the circuit through said relay whereby the circuit will remain closed even upon opening of the starting switch.

7. In an optical dividing head a rotatable spindle, first gear means operatively connected to said spindle for coarse adjustment thereof, a manually operable crank operatively connected to said first gear means for operating said first gear means, second gear means drivingly coupled to said first gear means, an adjusting wheel operatively connected to said second gear means for operating said second gear means for fine adjustment of said spindle through said first gear means, a disk fixed to said spindle for rotation therewith, a stop bolt mounted on said disk, an adjusting ring rotatably mounted on said spindle, an electric motor drivingly connected to said second gear means to adjust said spindle through said first gear means, there being an electric switch on said adjustable ring for energizing said electric motor, and an electrical circuit for controlling said electric motor and including a starting switch, a relay, and electrical contacts actuated by said disk electric switch so that closing of said starting switch will close the circuit through said relay whereby the circuit will remain closed even upon opening of the starting switch, the said electrical circuit further comprising a blade switch across said relay and in series with said contacts so that said motor will remain energized even upon opening of said relay but will be de-energized when said contacts are open.

8. In an optical dividing head a rotatable spindle, first gear means operatively connected to said spindle for coarse adjustment thereof, a manually operable crank operatively connected to said first gear means for operating said first gear means, second gear means drivingly coupled to said first gear means, an adjusting wheel operatively connected to said second gear means for operating said second gear means for fine adjustment of said spindle through said first gear means, a disk fixed to said spindle for rotation therewith, a stop bolt mounted on said disk, an adjusting ring rotatably mounted on said spindle, an electric motor drivingly connected to said second gear means to adjust said spindle through said first gear means, there being an electric switch on said adjustable ring for energizing said electric motor, and an electrical circuit for controlling said electric motor and including a starting switch, a relay, and electrical contacts actuated by said disk electric switch so that closing of said starting switch will close the circuit through said relay whereby the circuit will remain closed even upon opening of the starting switch, said electrical circuit further comprising a magnetic brake for said electric motor, a relay connecting said brake with a source of electrical energy, said relay being operable upon the opening of said electrical contacts to energize said magnetic brake to immediately bring said electric motor to a standstill.

9. In an optical dividing head a rotatable spindle, first gear means operatively connected to said spindle for coarse adjustment thereof, a manually operable crank operatively connected to said first gear means for operating said first gear means, second gear means drivingly coupled to said first gear means, an adjusting wheel operatively connected to said second gear means for operating said second gear means for fine adjustment of said spindle through said first gear means, a disk fixed to said spindle for rotation therewith, an adjusting ring rotatably mounted on said spindle, there being on said adjusting ring a 360° scale for indicating angles and a 360°/$n$ scale where $n$ is an integer for indicating fractions of a revolution, an indicator clamp slidably mounted on said adjusting ring for cooperation with said 360° and 360°/$n$ scales and having an abutment edge thereon, and an electric motor drivingly connected to said second gear means to adjust said spindle through said first gear means, there being an electric switch on said adjustable ring for energizing said electric motor, there being a second switch for connecting a resistance with said electric motor so that said electric motor will operate at a reduced speed.

10. In an optical dividing head a rotatable spindle, first gear means operatively connected to said spindle for coarse adjustment thereof, a manually operable crank operatively connected to said first gear means for operating said first gear means, second gear means drivingly coupled to said first gear means, an adjusting wheel operatively connected to said second gear means for operating said second gear means for fine adjustment of said spindle through said first gear means, a disk fixed to said spindle for rotation therewith, an adjusting ring rotatably mounted on said spindle, there being on said adjusting ring a 360° scale for indicating angles and a 360°/$n$ scale where $n$ is an integer for indicating fractions of a revolution, an indicator clamp slidably mounted on said adjusting ring for cooperation with said 360° and 360°/$n$ scales and having an abutment edge thereon, and an electric motor drivingly connected to said second gear means to adjust said spindle through said first gear means, there being an electric switch on said adjustable ring for energizing said electric motor, said abutment edge being engageable with a portion of said stop bolt to determine the rotation of the spindle when said spindle rotation is used as a feed motion during machining operation.

References Cited in the file of this patent

UNITED STATES PATENTS

| | | |
|---|---|---|
| 2,027,318 | Nelson | Jan. 7, 1936 |
| 2,634,623 | Kron | Apr. 14, 1953 |
| 2,686,458 | Klover | Aug. 17, 1954 |